United States Patent [19]

Jamison et al.

[11] Patent Number: 4,512,050
[45] Date of Patent: Apr. 23, 1985

[54] BEEHIVE VENTILATOR

[76] Inventors: Matthew Jamison, 4640 Valley Quail La., Santa Rosa, Calif. 95401; Charles C. Sharp, 1246 Enos Ave., Sebastopol, Calif. 95472

[21] Appl. No.: 573,808

[22] Filed: Jan. 25, 1984

[51] Int. Cl.³ ............................................. A01K 47/06
[52] U.S. Cl. ............................................................ 6/1
[58] Field of Search .............................. 6/1, 2 R, 12 R

[56] References Cited

U.S. PATENT DOCUMENTS

| 111,273 | 1/1871 | Swartz | 6/2 R |
| 2,292,110 | 8/1942 | Evans | 6/1 |
| 2,530,801 | 11/1950 | Babcock, Jr. | 6/1 |
| 2,574,768 | 11/1951 | Taylor | 6/1 |
| 3,927,431 | 12/1975 | Wallace | 6/1 |

FOREIGN PATENT DOCUMENTS 362369  11/1931  United Kingdom ...................... 6/1

Primary Examiner—Robert P. Swiatek
Attorney, Agent, or Firm—Brumbaugh, Graves, Donohue & Raymond

[57] ABSTRACT

A ventilator for a beehive having a longitudinally extending vent passage therein open at at least one end, a base adapted to be mounted on the cover of the beehive and having at least one vent opening communicating with the interior of the beehive and a control for opening and adjusting the vent opening.

10 Claims, 4 Drawing Figures

BEEHIVE VENTILATOR

BACKGROUND OF THE INVENTION

This invention relates to beehives and, more particularly, to a novel ventilator for a beehive which permits the flow of air through the beehive to be conveniently regulated for the control of the environment within the beehive.

The control of the environment within the beehive is important to the health and well-being of the bees which, in turn, is essential to obtain the maximum pollination of crops and the maximum output of honey from the bees. The hive should be ventilated to prevent the build-up of excessive moisture, particularly during the winter when dysentery and nosema can cause a high rate of mortality. On the other hand, excessive ventilation of the beehive is to be avoided. Such control must be achieved while protecting the hive from rain, sun, wind and other elements.

The need for ventilating beehives has been long recognized. The Wahl U.S. Pat. No. 2,709,820, issued June 7, 1955, and Steinrucken U.S. Pat. No. 4,257,133, issued Mar. 24, 1981, disclose beehive covers having louvered vents to provide protection from the elements and ventilation for the beehive. The Diehnelt U.S. Pat. No. 2,498,880, issued Feb. 28, 1950, discloses an insulated beehive cover having ventilating holes therein. Although these covers make provision for ventilating the beehives, there is no provision for controlling the ventilation of the beehive.

The Solomon U.S. Pat. No. 3,999,237, issued Dec. 28, 1976, and the Taylor U.S. Pat. No. 2,584,305, issued Feb. 5, 1952, disclose beehives having vents which can be adjusted to open and closed positions to vent the beehive through a roof or cover. The Solomon beehive embodies an internal tower, or shaft having a slide gate at the upper end thereof for controlling the ventilation. Since both the tower and the slide gate are covered by the roof, the slide gate is not very accessible. The Taylor patent discloses an automatic temperature controlled ventilator accommodated beneath the cover of the beehive. Neither the Solomon nor the Taylor ventilation systems are adapted for use in conventional beehives.

SUMMARY OF THE INVENTION

The beehive ventilator of the present invention includes a longitudinally extending vent passage open at at least one end, a base which is adapted to be mounted on top of a portion of the cover of a conventional beehive, one or more vent openings in the base communicating with the interior of the beehive and means accessible from the open end of the vent passages for opening and closing the vent opening or openings, so that the air flow can be controlled to close the vent or to open it fully or partially.

The ventilator of the present invention shields the vent passage from direct exposure to sun, wind and rain, provides a convenient adjustment to regulate the air flow through the beehive and can be dimensioned so as not to interfere with the stacking of hives one on top of another, such as, for example, when the beehives are being transported from one place to another.

DESCRIPTION OF THE DRAWINGS

For a complete understanding of the present invention, reference can be made to the detailed description which follows and to the accompanying drawings, in which.

DESCRIPTION OF THE EMBODIMENTS

Figure 1:
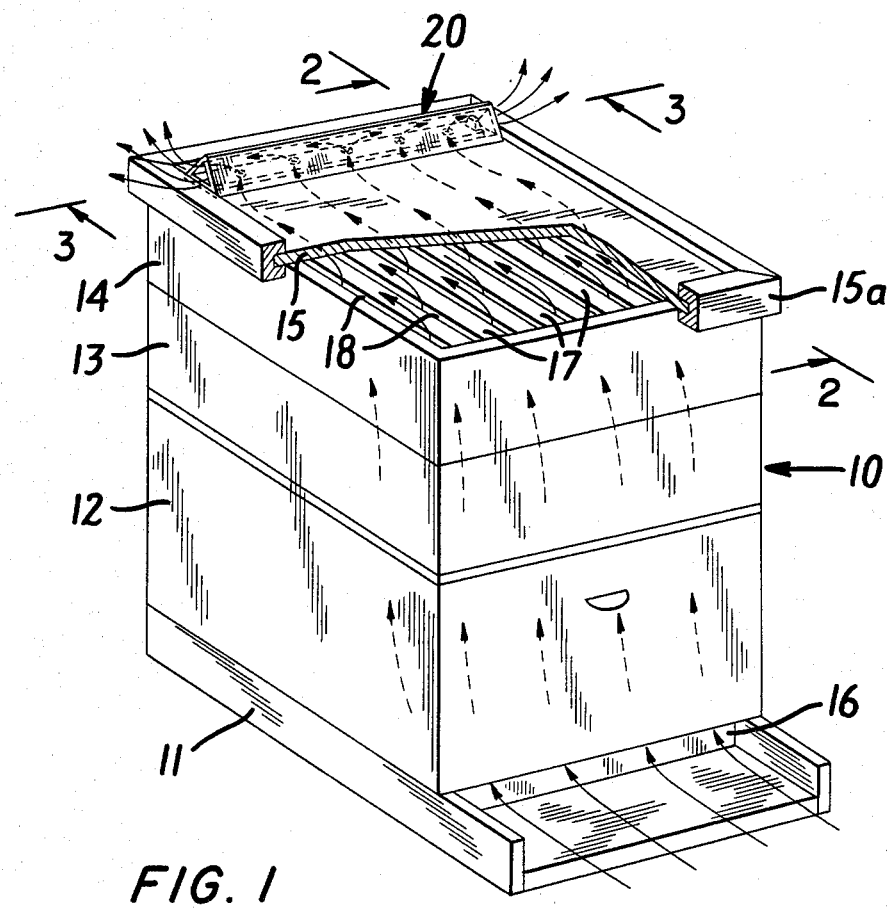
FIG. 1 is a perspective view of a conventional beehive embodying the ventilator of the present invention.
Figure 2:
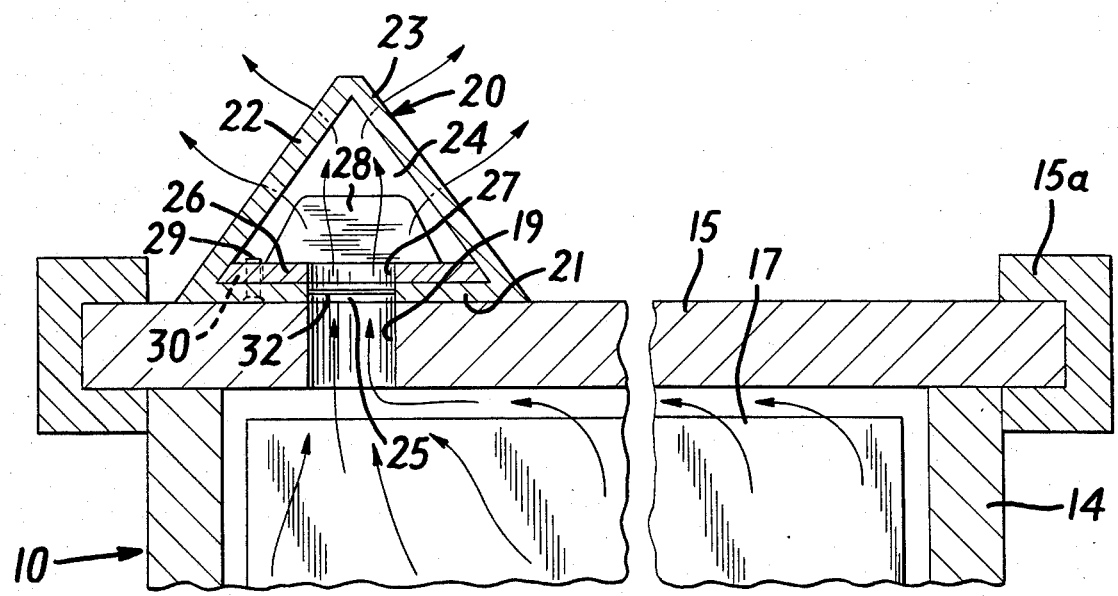
FIGS. 2 and 3 are sectional views taken along the lines 2—2 and 3—3 of FIG. 1, respectively, looking in the direction of the arrows.
Figure 3:
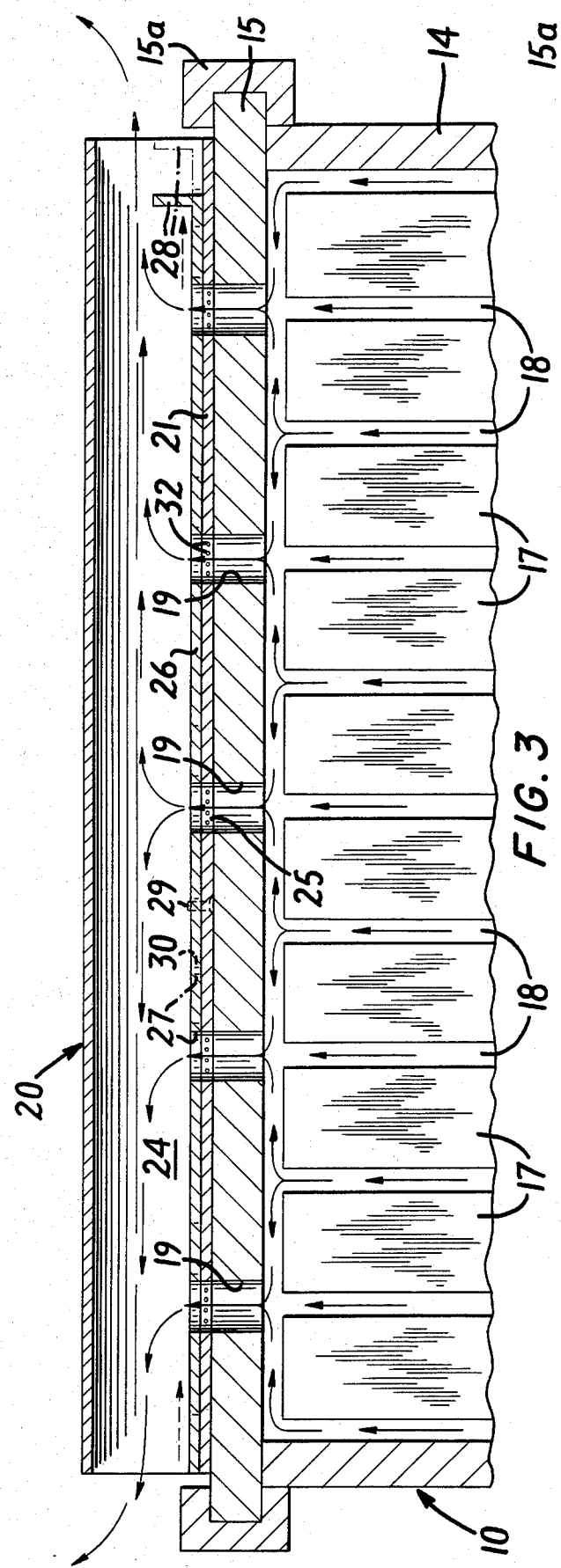
Figure 4:
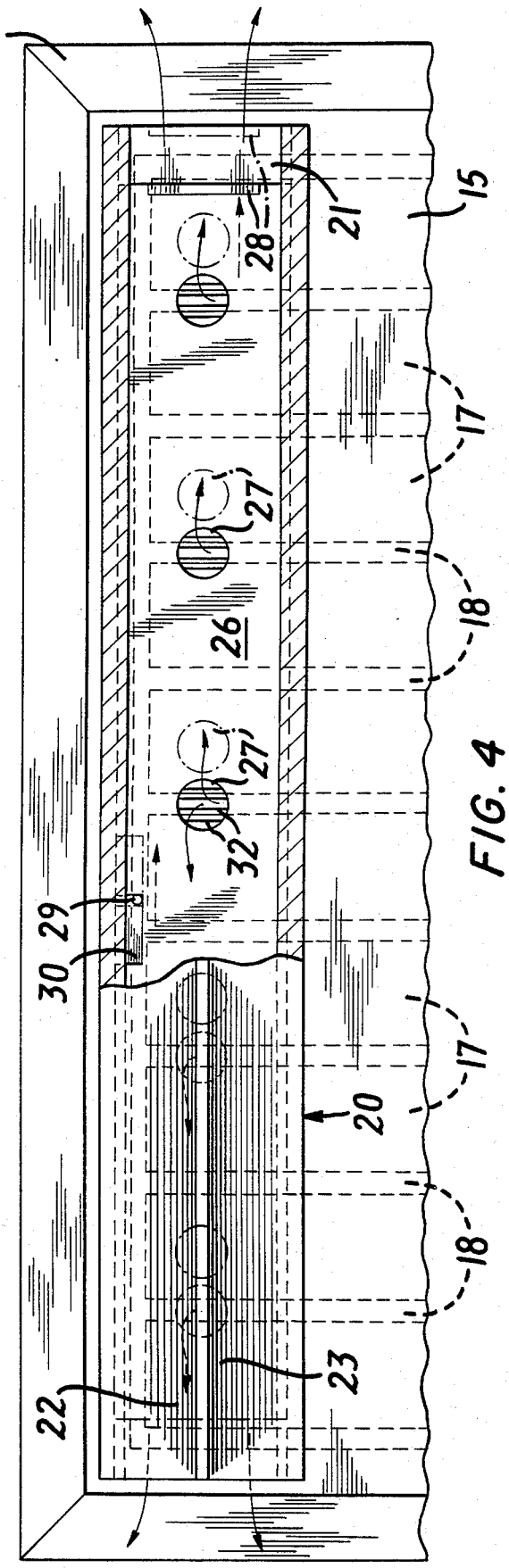
FIG. 4 is a plan view of the beehive ventilator of the present invention with portions broken away to show the operation thereof.

FIG. 1 of the drawings shows a conventional beehive of the Langstroth type which is widely used for keeping bees for the commercial production of honey. This beehive is a box-like structure 10 which includes a base 11, a lower hive body 12, super sections 13, 14 and a cover 15. One end of the base section 11 is provided with a bee entrance 16.

The interior of the beehive contains a plurality of parallel frames 17 extending substantially the entire length from the front to the rear of the beehive. The frames 17 are separated from each other and from the walls of the beehive by bee spaces 18. Although each of the sections 12, 13 and 14 contains frames, only the frames in the upper section 14 of the beehive are shown in the drawings. The cover 15 of the beehive has an outer frame 15a which is in telescoping relation with the upper end of the beehive.

In accordance with the present invention, a transverse row of spaced apart vent openings 19 is formed in the cover near the rear end thereof to provide air flow through the beehive from the bee entrance 16 through the bee spaces 18. In the particular embodiment shown, the vent openings 19 in the cover are spaced apart a distance of about the widths of two frames.

The beehive ventilator 20 of the present invention is mounted to the top of the beehive cover above the vent openings 19 therein. The beehive ventilator 20 includes a flat base 21 which sits on the beehive cover and a pair of sloped walls 22, 23, which define a transversely extending air duct, open at both ends, across the width of the beehive. The sloped walls 22, 23 form a protective roof for the vent passage and vent holes in the cover to shield the vent holes fron exposure to sun, wind and rain.

The base 21 of the beehive ventilator has a plurality of vent openings 25 therein which are in alignment with the vent openings 19 in the beehive cover. These vent openings 25 can be opened, closed or partially opened by the longitudinal adjustment of a slide plate 26 accommodated in the beehive ventilator above the base 21 thereof.

The slide plate 26 also contains a plurality of openings 27 therein which in the open position of adjustment are in alignment with the openings 25 in the base of the vent and in the closed position of adjustment are out of alignment with the openings 25 to close the vent openings 19 in the cover of the beehive. The slide plate 26 has a handle 28 at one end which is readily accessible to facilitate the adjustment of the slide plate. The stroke of the slide plate is limited by a stop 29 which extends upwardly from the base of the vent to engage a slot 30 formed in one edge of the slide. The stroke of the slide is limited by the length of the slot 30.

By control of the adjustment of the slide and the size of the vent openings it is possible to provide effective control over the rate at which ambient air is permitted to enter through the bee entrance 16 and exit through the vent passage 24 of the ventilator. To insure adequate ventilation in a conventional ten frame beehive of the Langstroth type, the effective size of each of the five vent openings should be about 15 mm. in diameter or larger. These vent openings should be screened to prevent bees from exiting through the vent passage. Toward this end the openings 25 in the base of the vent are shown subdivided by a plurality of wires 32 spaced no more than 3 mm. apart. A screen can also be mounted on the cover of the beehive or interposed between the base 21 and the slde 26 of the vent.

The beehive ventilator of the present invention can be adjusted to allow air to circulate through the beehive in an amount necessary to prevent excessive moisture in the beehive without over ventilating.

In a preferred and best mode of the invention for use with a conventional ten frame Langstroth beehive, the ventilator is about 41 cm. long and the base 21 is about 6 cm. wide. The sloped walls 22, 23 are about 4.8 cm. from the base of the ventilator to the peak thereof, and the overall height of the ventilator from base to peak is about 3.8 cm. The height of the vent does not interfere with the stacking of beehives one on top of another which is necessary when they are being transported from one place to another. Moreover, the vent openings can be adjusted to control ventilation even when the beehives are stacked.

The invention has been shown in a single preferred form and by way of example and many modifications and variations can be made therein within the spirit of the invention. The invention, therefore, is not intended to be limited to any specific form or embodiment except insofar as such limitations are expressly set forth in the claims.

We claim:

1. A ventilator for a beehive comprising means defining a longitudinally extending vent passage open at at least one end, a base adapted to be mounted to the upper surface of a cover for the beehive, at least one vent opening in said base and communicating with the interior of the beehive beneath the beehive cover, and means accessible from the open end of the vent passage for opening and closing at least one vent opening to control the flow of air from the interior of the beehive to the vent passage.

2. A beehive ventilator as set forth in claim 1 in which the vent passage extends across at least a portion of the upper surface of the beehive cover and the base of the ventilator contains a plurality of spaced apart vent openings and in which said means for opening and closing at least one vent opening includes means for opening and closing all of the vent openings.

3. A beehive ventilator as set forth in claim 2, in which the means for opening and closing the vent openings includes a slide guided for longitudinal movement relative to the base of the ventilator and a plurality of vent openings in the slide movable into and out of alignment with the vent openings in the base to open or close air passages from the interior of the beehive to the vent passage in the ventilator.

4. A beehive ventilator as set forth in claim 3, including means for limiting the displacement of the slide between open and closed positions.

5. A beehive ventilator as set forth in claim 1, in which the vent passage is defined by at least a pair of walls mounted to said base.

6. A beehive ventilator as set forth in claim 5, in which the walls are sloped to define an elongated vent passage of triangular cross-section, the sloped walls serving as a roof to protect the vent passage and the beehive from the elements.

7. A beehive ventilator as set forth in claim 1, including a screen for the at least one vent opening to prevent the bees from exiting from the beehive through the at least one vent opening.

8. A ventilator for a beehive comprising means defining a longitudinally extending vent passage open at at least one end, a base adapted to be mounted to the upper surface of a cover for the beehive, a pair of sloped walls mounted to said base to define an elongated vent passage of triangular cross section, the sloped walls serving as a roof to protect the vent passage and the beehive from the elements, at least one vent opening in said base and communicating with the interior of the beehive beneath the beehive cover, and means for opening and closing at least one vent opening to control the flow of air from the interior of the beehive to the vent passage.

9. A ventilator for a beehive comprising means defining a longitudinally extending vent passage across at least a portion of the upper surface of a beehive cover and open at least one end, a base adapted to be mounted to the upper surface of the cover for the beehive, a plurality of spaced apart vent openings in said base and communicating with the interior of the beehive beneath the beehive cover and means for opening and closing the vent openings to control the flow of air from the interior of the beehive to the vent passage, said means for opening and closing the vent openings including a slide guided for longitudinal movement relative to the base of the ventilator and a plurality of vent openings in the slide movable into and out of alignment with the vent openings in the base to open or close air passages from the interior of the beehive to the vent passage in the ventilator.

10. A beehive ventilator as set forth in claim 9, including means for limiting the displacement of the slide between open and closed positions.

* * * * *